Figure 1:
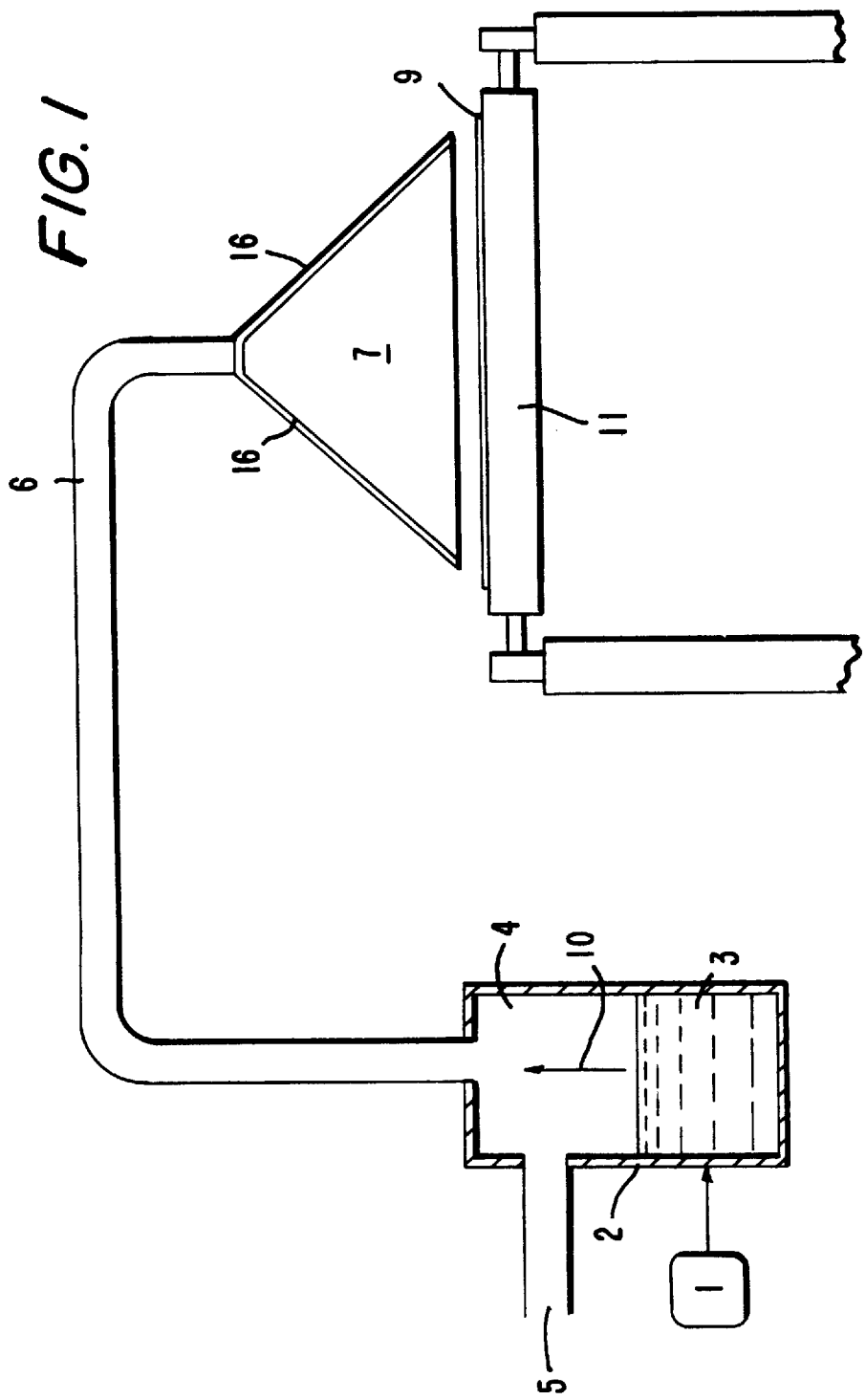

United States Patent
Falcony-Guajardo et al.

[11] Patent Number: 5,882,368
[45] Date of Patent: Mar. 16, 1999

[54] METHOD FOR COATING GLASS SUBSTRATES BY ULTRASONIC NEBULIZATION OF SOLUTIONS

[75] Inventors: Ciro Falcony-Guajardo, Naucalpan; Milan Jergel; Agustín Conde-Gallardo, both of México; Manuel García-Hipólito, Naucalpan; Herbert Scheffler-Hudlet, México; Rafaél Avalos-Guzmán, Coacalco, all of Mexico

[73] Assignee: Vidrio Piiano De Mexico, S.A. DE C.V., Tlalnepantla, Mexico

[21] Appl. No.: 796,623

[22] Filed: Feb. 7, 1997

[51] Int. Cl.[6] .......................... C03C 17/00; C03C 25/02; C03B 27/00
[52] U.S. Cl. .......................... 65/60.1; 65/60.3; 65/60.7; 65/117; 65/118; 65/119; 427/160; 427/165; 427/248.1
[58] Field of Search .................................. 65/60.1, 60.3, 65/60.7, 117, 118, 119; 427/160, 163.1, 165, 248.1, 561

[56] References Cited

U.S. PATENT DOCUMENTS

| | | |
|---|---|---|
| 2,668,565 | 2/1954 | Clay . |
| 3,660,061 | 5/1972 | Donley et al. .................. 65/32 |
| 4,230,744 | 10/1980 | Blankenship ..................... 427/163 |
| 4,234,331 | 11/1980 | Gray et al. ..................... 65/60 |
| 4,308,319 | 12/1981 | Michelotti et al. ................ 428/432 |
| 4,374,156 | 2/1983 | Vong .............................. 427/428 |
| 4,393,098 | 7/1983 | Stinson et al. ................... 427/168 |
| 4,397,671 | 8/1983 | Vong .............................. 427/190 |
| 4,401,474 | 8/1983 | Donley ............................ 106/243 |
| 4,655,810 | 4/1987 | Van Cauter et al. ............... 65/60.4 |
| 4,719,127 | 1/1988 | Greenberg ....................... 427/165 |
| 5,134,021 | 7/1992 | Hosono et al. ................... 428/213 |
| 5,356,718 | 10/1994 | Ahtey et al. ..................... 428/428 |
| 5,393,593 | 2/1995 | Gulotta et al. .................. 428/220 |
| 5,522,911 | 6/1996 | Terneu et al. ................... 65/27 |
| 5,540,959 | 7/1996 | Wang ............................. 427/561 |

Primary Examiner—James Derrington
Assistant Examiner—Jacqueline A. Ruller
Attorney, Agent, or Firm—Abelman, Frayne & Schwab

[57] ABSTRACT

A method and an apparatus for coating a hot glass substrate with a mist of fine droplets from a solution of a chemical precursor or mixture of precursors in a solvent, by nebulizing a solution with ultrasonic vibration to form a mist of fine droplets; conducting the mist to the hot glass substrate; and depositing the mist on the hot glass substrate to pirolize it and form the desired coating on the glass substrate. The nebulization is carried out by applying vibration of ultrasonic frequency to the solution obtaining the mist of fine droplets and conducting the fine droplets by a stream of a carrier gas, to be deposited on a surface of the hot glass substrate, particularly on a continuous glass ribbon during production in the float glass manufacturing process mainly at the beginning of the annealing chamber where the temperature of glass ribbon is 580° C.–610° C. The coated glass article resultant with this treatment is a spectrally selective reflective product which can be used for construction and automotive applications.

5 Claims, 3 Drawing Sheets

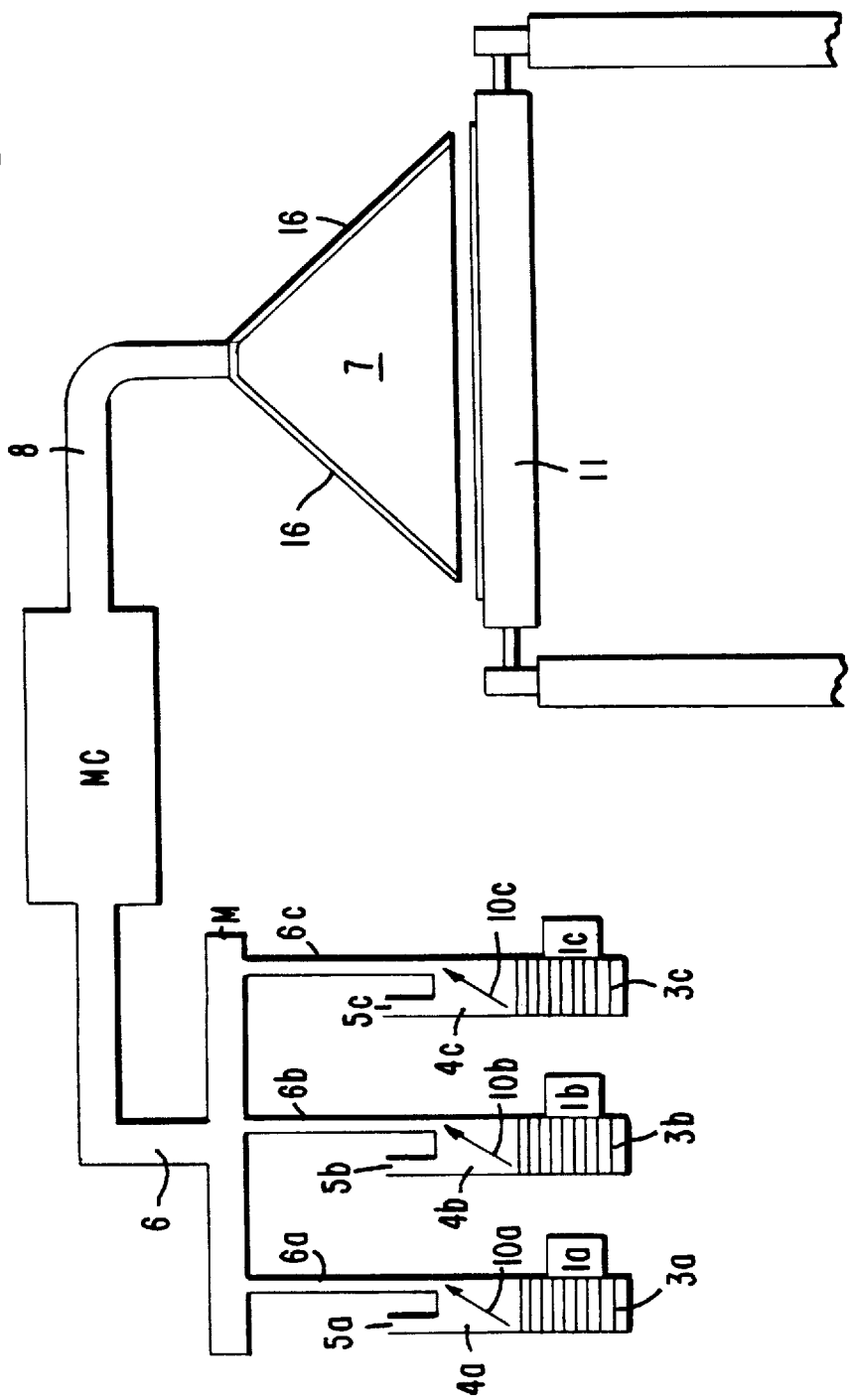

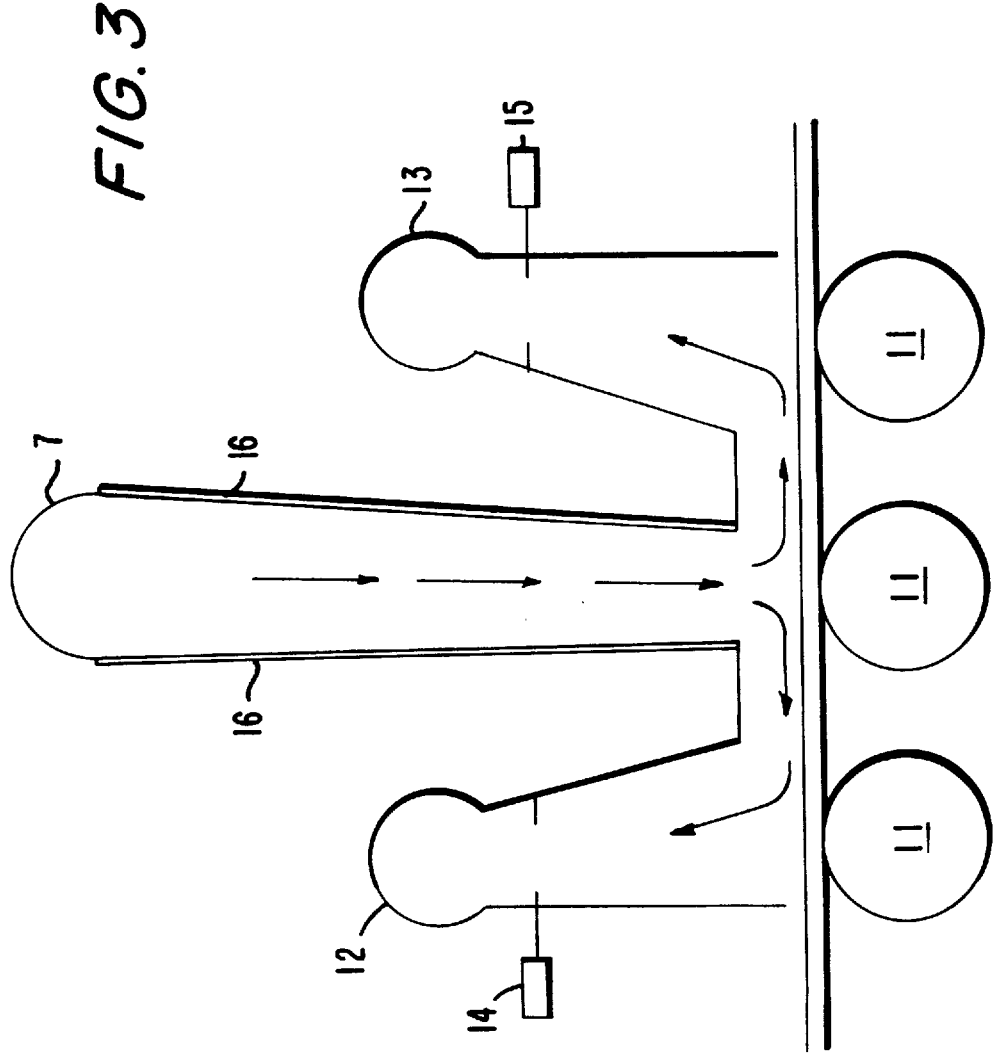

METHOD FOR COATING GLASS SUBSTRATES BY ULTRASONIC NEBULIZATION OF SOLUTIONS

BACKGROUND OF THE INVENTION

A. Field of the Invention

This invention refers to a method and apparatus for coating a glass substrate by ultrasonic nebulization of a solution, and more specifically to a method and apparatus for coating a hot glass substrate with a mist from a solution of a chemical precursor or mixture of precursors of one or more metal oxides in a solvent, by nebulizing the solution with ultrasonic vibration, to form the mist of fine droplets, conducting the mist to the hot glass substrate, and depositing the mist in the hot glass substrate to pyrolize it and form the desired coating.

B. Description of the Related Art

In the glass for automotive purposes, it is highly desirable that the glass have an aesthetic color, adequate visible light transmittance and low infrared (IR) and ultraviolet (UV) transmittances of the solar radiation, in order to allow the driver a good visibility of his surroundings, thus complying with the regulations of automotive safety, and controlling the accumulation of heat in the interior of the vehicles, resulting in a reduction in the consumption of energy for the automotive air conditioning equipment, and protecting vehicle materials from harmful UV radiation.

Similarly, in glass for architectonic purposes, it is highly desirable that the glass have an aesthetic color, visible light transmittance and thermal absorption properties, so as to reduce the glare and climate conditioning needs, which will result in a reduction in the consumption of electric energy for the building air conditioning equipment, also protecting plastic and fabric materials from padding DME to harmful UV radiation.

It is well known that the desirable color, visible, IR and UV transmittance characteristics of the glass can be controlled by adding several coloring agents to the glass manufacturing composition, i.e. these properties are provided directly through the glass mass.

The above disclosed properties can also be imparted to the glass by depositing coatings of organic or inorganic materials on either one or both of the surfaces of a glass sheet, which additionally provide a light, IR and UV reflecting properties which contribute to the reduction of energy consumption.

Specifically in coated glass, it is also desirable to provide the glass with an appearance and color similar to those of glass compositions containing coloring ingredients homogeneously dispersed throughout the glass.

One of the most commonly used methods to provide a suitable coating on the glass is the so known pyrolytic method. Also, There is a wide number of known techniques for preparing pyrolytic thin films by procedures and mechanisms of depositions, to provide a coating on the glass imparting the appearance, color and thermal properties similar to those of glass compositions.

Examples of methods for preparing thin films are: chemical vapor deposition; electrolytic deposition; vacuum deposition; plasma deposition; solid and liquid phase deposition, etc. Some of these methods are carried out on line during the continuous production of float glass, having their own advantages, limitations and complexity of operation.

Some pyrolytic methods involve the use of solid precursors, applied in a powder state directly on the hot glass; some other are related with the use of a solution of chemical precursors in a solvent, spraying the solution on the hot glass; and some other refer to methods for applying liquid suspensions of chemical precursors also in a sprayed form on the glass.

Examples of such patented inventions are described in the following for reference.

U.S. Pat. No. 4,397,671 issued on August 1983 to Jong and Harbor, discloses a method for applying a metal oxide film on a surface of a heated glass substrate, by spraying a heat decomposable organic-based metal salt powder on the glass ribbon. The spray powder is delivered by a gaseous stream to a location spaced above of the moving glass ribbon, and accelerated by a high velocity stream of air and directed downwardly towards the moving glass ribbon and longitudinally along the direction of movement of the glass substrate. Special emphasis is given to the size of the powder spraying, to the method for preparing the powder and to the way of how this powder is sprayed on the glass.

U.S. Pat. No. 4,393,098 issued on Jul. 12, 1983 to Stinson et al, discloses a method similar to the disclosed in the above mentioned patent, particularly referring to the use of a powder with more specific characteristics like size (about 6 microns), shape or form (spherical) of the particles and the composition of the particle itself (70% cobalt, 19% iron and 11% chromium).

U.S. Pat. No. 3,660,061 to Donley et al, discloses a method of coating a surface of a newly formed heated glass sheet with a solution of a metal oxide film forming composition, in an oxidizing atmosphere. The coating is applied by exposing the glass sheet to said composition for at least 3 seconds, immediately after the glass sheet has been removed from a reducing atmosphere containing molten tin and its vapor, while the glass surface is at a temperature sufficiently high to pyrolize the composition to form a metal oxide coating thereon of sufficient thickness to provide the coated glass with desired properties, such as transmittance of infrared and ultraviolet radiation. Care is taken to ensure that the carrier for such composition does not evaporate completely on route to the glass surface to avoid a mottle appearance.

U.S. Pat. No. 5,393,593 to Gulotta et al discloses a process for the production of a coated glass, using, as substrate, a dark gray glass having different properties that can be obtained with combination of different glass compositions and different compositions of the coating film. Such properties are mainly luminous, infrared and total solar energy transmittance which are obtained in lower values compared with values corresponding to not coated colored glass. The method for deposition of coating on the glass is by pneumatic spraying of an aqueous suspension which is prepared with certain proportions of organic based metal salt powder finally divided and suspended in water. The suspension is applied on a continuous glass ribbon at about 590° C. during its production.

U.S. Pat. No. 4,719,127 to Greenberg is related also with coatings of metal oxides deposited from an aqueous suspension wherein organometallic coating reactants typically used in organic solutions are chemically suspended in an aqueous medium by the use of a chemical wetting agent in combination with extremely fine powder reactants. The organometallic coating reactants chemically suspended in an aqueous medium may be pyrolytically deposited to form metal oxide films on a hot glass substrate using conventional spray equipment, and under temperature and atmosphere conditions generally encountered in pyrolytic coating operations.

U.S. Pat. No. 2,688,565 to Raymond, and No. 4,308,319 to Michelotti et al disclose the generation of a coating composition pneumatically from an aqueous cobalt-nitrate solution. In most cases, acetylacetonate metal salts dissolved either in water but preferably in a suitable organic solvent, are used for pneumatic generation of coating compositions as it is taught by Donley in his U.S. Pat. Nos. 3,660,061 and 4,401,474, or in U.S. Pat. Nos. 4,308,319 to Michelotti and 5,356,718 to Athey et al.

Nevertheless all of such methods show important disadvantages when they are compared with the chemical vapor deposition methods in terms of versatility, adaptability, compatibility, simplicity, quality, reproducibility, productivity and cheapness.

The methods of chemical vapor deposition for the deposition of a thin film coating on one surface of a hot glass substrate, generally includes a gas or volatile liquid source; a reactant gas source; a gas mixing and distribution system; a reaction chamber and a scrubber system for exhaust gases As metal salts, two typical groups of material are known as being usually used, i.e. the nitrate salts and more often acetylacetonates. The known art has also disclosed that spray guns based on pneumatic principle, are preferably used to supply precursors consisting of a particular coating composition and the carrier gas, such as those disclosed in U.S. Pat. No. 4,234,331 to Gray et al and in U.S. Pat. No. 5,356,718 to Athey et al.

Therefore applicants have found that, if actually there are limited amount of precursors available to be used in gaseous way, attention had to be focused to find procedures, if any, to transform pyrolyzable solutions in microdroplets, finding two principal procedures available in the market, which are used in other areas;

(1) By electrostatic and pressure nebulization, also called microsprayers, which are based on the principle of transferring an electrostatic charge to the liquid which at the exit of the atomizer nozzles is transformed in fine droplets by the tendency of repulsion of the electric charge. The higher the electrostatic charge of the liquid, the smaller the size of the micro droplets. The inconveniences of this procedure is that some liquid with higher values of conductivity, cannot retain high levels of electrostatic charges and consequently cannot be conveniently nebulized and would need the help of pressure in the liquid which increase nebulization when the liquid exits through the nozzles; and (2) By ultrasonic atomization of solutions, which is used mainly for various medical and industrial applications, as disclosed in French Patent No. 7,038,371 to Spitz et al. The patent teaches that the ultrasonic nebulization technique is particularly suitable for deposition of very thin transparent semiconductant oxides. This method, called in the Spitz's patent teaching as Pyrosol process, has many advantages if compared to the conventional pneumatic atomization techniques.

This procedure has been carried out by ultrasonic nozzles which are commercially available in the market, basically consisting of a liquid delivery unit, a flow control module and the ultrasonic nozzle arrangement which includes a piezoelectric vibrator. However, in the applicant's opinion, this procedure produces a fraction of droplets bigger than the desired size and therefor has to include some means for removing them by the use of a tramp which works as a filter The method of deposition by ultrasonic nebulization of solutions, in accordance with the present invention and which will be disclosed hereinbelow, overcomes the above disclosed limitations because it is a way to practically vaporize and apply the precursor or mixture of precursors, as a gas, to the hot glass to provide a desired coating, in a similar way as the chemical vapor deposition process.

The method of the present invention involves the application of ultrasonic vibration to a solution prepared with a chemical precursor or mixture of precursors, in a solvent, which, by a controllable ultrasonic vibration input, is controllably nebulized in a great amount of very fine liquid droplets which are conduced by a carrier gaseous stream, almost like another gas, through pipes, to a coating chamber over the hot glass substrate, in order to be deposited as a very uniform film with desired light and thermal reflective properties.

This method is particularly applicable on a continuous glass ribbon during the production, in the float glass manufacture process, at a location where the temperature is sufficiently high to form the oxide type film on the glass with convenient properties. The best location for treatment of the glass ribbon with this method is at the beginning of the annealing chamber where the temperature of the glass ribbon is 580° C.–610 °C.

The chemical precursors can be selected from a very wide group of available precursors provided that they can be soluble in a suitable solvent, preferably with a viscosity similar to the water and that can be pyrolyzed at elevated temperatures.

A convenient chemical precursor that can be used in the method of the present invention is the acetylacetonate of cobalt, chromium, iron, titanium, zirconium, or other chemical elements depending on the desired properties to be imparted to the glass, or mixture thereof. Organic or inorganic solvents such as methylene chloride, dimethylformamide, trichloroethylene, isopropylic alcohol, toluene, xilene, carbon tetrachloride, etc., can be used.

Condensation in the walls of the conducting pipe can be minimized by controlling the concentration of droplets of the solution in the carrier gas and also controlling the temperature of the conduction pipe.

Depending of the vapor pressure of the solvent used for preparing the solution, it is possible that during conduction of the ultrasonic nebulization, the small droplets of the solution could lose the solvent content converting the droplets to microparticles which also tend to flow in the stream of the carrier gas.

When the small droplets of the solution or the microparticles reach to the proximity of the hot glass surface, their temperature is rapidly increased vaporizing the residual solvent, so that the solid microparticles start to react with the oxygen of the carrier gas stream on the glass surface, forming the metallic oxide film. The solid particles which react prematurely in the gaseous phase tend to form reaction products which do not take part of the film and then they are removed in the flow of exhaust products together with residual air, vaporized solvent and unreacted product of the chemical precursor.

The main advantages which can be obtained with the use of the method of the present invention for obtaining a thin film of oxides on glass, are the following;

It is possible to have a wide range of film compositions by providing a preparation of a liquid solution with similar viscosity than water.

The very high level of surface planarity and homogeneity which can be obtained in the film by the use of very fine droplets nebulized as an aerosol by ultrasonic vibration, compared with the droplets obtained by pneumatic spraying systems or ultrasonic nozzle considered in different methods.

Size diameter in droplets obtained with the ultrasonic method can be of less than 10 microns, while with pneumatic spraying systems, droplet size is normally over 100 microns with a wide range size.

The nebulized aerosol can be conducted in a stream flow of gaseous air almost like another gas and then, as has been described above, in many concepts, the total deposition process can be considered as a chemical vapor deposition process with the advantages that this process offers.

As will be described in detail below, our invention overcome the actual limitations that commonly happen when the purpose is to deposit oxide type films on glass by a traditional chemical vapor deposition technique, and besides our method is far away of methods just described in a general way above in referenced patents.

SUMMARY OF THE INVENTION

It is therefore a main objective of this invention, to provide a method and apparatus for coating a glass substrate, based on ultrasonic nebulization of coating solutions providing an efficient deposition.

It is also a main objective of this invention, to provide a method and apparatus for coating a glass substrate with a mist of very fine droplets from a solution of a chemical precursor or mixture of precursors in a solvent, by nebulizing the solution with ultrasonic vibration to form a mist of fine droplets; conducting the mist to the hot glass substrate; and depositing the mist on the hot glass substrate to pyrolyze it and form the desired coating on the glass substrate It is still another main objective of the present invention, to provide a method and apparatus for coating a glass substrate, based on ultrasonic nebulization of coating solutions of the above disclosed nature, allowing better control of the parameters such as droplet size, transport and deposition kinetics and thickness of the film.

It is a further main objective of the present invention, to provide a method and apparatus for coating a glass substrate, based-on ultrasonic nebulization of coating solutions of the above disclosed nature, by nebulizing independent solutions, each having a different chemical precursor or mixtures of precursors in a selective solvent, providing a plurality of independent mists, which afterwards are mixed to form a single mist.

These and other objectives and advantages of the present invention will be apparent to those persons skilled in the art, from the following description of the preferred embodiments of the invention, which are not a limitation to the scope of the invention but they have to be considered only as illustrations thereof.

BRIEF DESCRIPTION OF THE DRAWINGS

Referring now to drawings which show schematically an arrangement of the apparatus for manufacture of reflecting glass products.

FIG. 1 is a schematic partial cross section view of the main components of the apparatus according to a first embodiment of the invention in a float glass production line;

FIG. 2, is a schematic partial cross section view of the main components of the apparatus according to a second embodiment of the invention shown in FIG. 1; and FIG. 3, is a detailed schematic partial cross section view of the applicator chamber of the apparatus of FIGS. 1 or 2.

DETAILED DESCRIPTION OF THE INVENTION

The present invention will be firstly described in the following with reference to the apparatus for coating a glass substrate, located in a line of production of a so called float glass, wherein the best position in said line of production, is at the beginning of the annealing chamber.

The apparatus for coating a glass substrate with a mist of liquid fine droplets, by nebulizing a solution with ultrasonic vibration to form a mist of fine droplets in accordance with a first embodiment of the present invention, comprises:

a reservoir 2 containing a solution 3 prepared from a desired composition and concentration of metal compounds in a suitable solvent, and having a mist accumulation chamber 4 placed over the solution 3;

an electronic generator 1, physically connected with the reservoir 2, which generates piezoelectric ultrasonic excitations of desired frequency to said solution in the reservoir 2, to nebulize the solution in a mist 10 of very fine liquid droplets, in the mist accumulation chamber 4 of the reservoir 2, in accordance with the required amount of nebulized solution;

a conduit 5 connected to the chamber 4 and to a source of a carrier gas, usually air (not illustrated), to provide a controlled stream of the carrier gas to carry away the mist 10 from the chamber 4;

a pipe 6 connected to the chamber 4, to conduct the mist 10 carried away by the stream of carrier gas; and an applicator chamber 7 connected to the chamber 4 through the pipe 6, to receive the mist 10 carried away by the stream of carrier gas, which is located above the glass ribbon 9 in the region where the temperature of glass ribbon is convenient for the maximum efficiency of reaction of the precursors by pyrolysis, in order to deposit a thin film of fine liquid droplets, in an uniform way, on the entire width of glass ribbon 9 to be pyrolyzed on the hot glass and form the coating.

In a second embodiment of the invention, illustrated in FIG. 2, there is shown an arrangement of three reservoirs 2*a*, 2*b*, 2*c* each containing a different solution 3*a*, 3*b*, 5*c* of a suitable composition and concentration of metal compound (s) in a selective solvent, and a mist accumulation chamber 4', 4", 4"'; for mists 10*a*, 10*b* and 10*c*.

three generators of ultrasonic nebulization 1*a*, 1*b* and 1*c* each connected to a corresponding reservoir 2*a*, 2*b*, 2*c*, in order nebulize the corresponding solution 3*a*, 3*b*, and 3*c*, in the corresponding chamber 4*a*, 4*b*, 4*c;* three conduits 5*a*, 5*b*, 5*c* , each connected to a corresponding chamber 4*a*, 4*b*, 4*c* and to a source of a carrier gas, to provide the controlled stream of carrier gas to carry away the mist 10*a*, 10*b*, 10*c* from the chambers 4*a*, 4*b*, 4*c;* three pipes 6*a*, 6*b*, 6*c*, each connected to a corresponding chamber 4*a*, 4*b*, 4*c*, to conduct the mists 10*a*, 10*b*, 10*c* carried away by the stream of carrier gas;

a manifold M to which is connected each of the pipes 6 from each reservoir 2*a*, 2*b*, 2*c*, receiving the mist form each chamber 4*a*, 4*b*, 4*c;* a mixing chamber MC connected to the manifold M through a conduit 8, in which the mists 10*a*, 10*b*, 10*c* from each independent reservoir is mixed with the mist of the other reservoirs, forming a single mist; and an applicator chamber 7 connected to the mixing chamber MC through the conduit 8, to receive the single mist and which is located above the glass ribbon 9, in order to deposit a thin film of fine liquid droplets, in an uniform way, on the entire width of glass ribbon 9 to be pyrolyzed on the hot glass and form the coating.

In the float glass process, the glass ribbon 9 is supported and transported on rollers 11 at a controlled velocity.

Considering the high temperatures that can prevail in the coating region, the applicator chamber 7 is protected by a fluid cooled jacket 16 to properly maintain the temperature of the mist and the air flowing inside of said applicator chamber 7.

The uniform distribution of the stream of carrier gas is obtained by measuring the velocity of the gas in different points across the exit of applicator chamber and adjusting the profile of the flow with internal modular dampers (not shown).

The applicator chamber 7 is located at specific distance above the glass ribbon and in a parallel position with respect to the same glass ribbon:

As shown in FIG. 3, the applicator chamber may include extraction chambers 12 and 13 respectively located upstream and downstream of said applicator chamber 7, to extract the exhaust carrier gas with unreacted mist, powders of reaction and solvents. A uniform profile of suction of each extraction chamber 12 and 13 can be adjusted by positioning dampers 14 and 15 in each of said chambers 12 and 13.

The uniformity of coating and thickness of coating is mainly controlled by: the input of ultrasonic excitation to the solutions, which produce more or less volumes of each solution nebulized; the volume of flow of carrier gas; the separation between applicator chamber and glass ribbon; and the intensity of suction of both extraction chambers, together with uniformity of suction adjusted by extraction dampers.

In accordance with the method for coating a glass substrate with a mist of liquid fine droplets, of the present invention, this method comprising, in its most generic concept, of:

nebulizing a solution by ultrasonic vibration to form a mist of liquid fine droplets;

conducting the mist to the glass substrate; and depositing the mist on the glass substrate to form a coating on the glass substrate.

In this way, the solution of suitable metallic reactants, contained in a reservoir 2, is nebulized in a mist accumulation chamber 4, by means of an ultrasonic vibration provided by an electronic generator 1, physically connected with the reservoir 2. The generated mist 10 is then carried by a stream of a carrier gas, introduced through a conduit 5, which conduces the mist 10 of fine droplets through a conduction pipe 6 into an applicator chamber 7. Once the mist 10 is introduced into the application chamber 7, a second stream of gas can be used to force the mist to contact the hot surface of the glass substrate 9 preferably a float glass ribbon, depositing the mist on the glass substrate to form the coating on the glass substrate. The pyrolitic reaction of the mist of fine droplets on the surface is a complicated process which depends on the substrate temperature and the reactants involved. In the case of interest for this invention, the process involves the nebulization solution identified in the following, by a process in which the reactant materials are decomposed and oxidized forming a recurred oxide layer that is deposited on the top of the glass substrate. The thickness of the film is also dependent on the concentration of the reactants of this solution as well as on the time of deposition. The optical characteristics of the film also depend on the thickness of the film as well as on its chemical composition.

Acetylacetonates are preferred as reactants in the present invention, however other organometallic and inorganic compounds may also be employed. The solvent used for the preparation of the spraying solution has to be picked up in such a way that the chosen reactant has a proper solubility and also it should have the viscosity and density as low as possible in order to optimize the deposition process as well as the aerosol generation by ultrasonic means.

The average droplet size depends on the frequency of the ultrasonic generator and the viscosity and density of the solution, for a frequency of 1 MHz and the water viscosity and density. The size of the droplets is typically 5 microns in diameter with a very narrow distribution of a couple of microns. Once the mist is generated, it is transported and forced on to the surface of the glass to produce the pyrolytic reaction required to obtained the desired metallic oxide coating. The solution used for the above described process, should have as low as possible viscosity and density, since the lower this values are, the smaller the droplet size is, allowing a better deposition process. The essential feature of this invention involves the generation of the mist required for the pyrolytic reaction on the float glass ribbon as well as the apparatus required to carry out such process.

In a second embodiment of the method of the present invention, the nebulizing of the solution is carried out in independent reservoirs, each having a different chemical precursor or mixtures of precursors in a selective solvent, providing an independent mist, which is afterwards mixed with the mist of the other reservoirs in a mixing chamber to form a single mist.

The present invention will be better understood from the description of specific examples as follows.

EXAMPLE 1

A spraying solution is prepared by dissolving 15 gr. of cobaltous acetylacetonate, 1 gr. of ferric acetylacetonate and 1 gr. of chromic acetylacetonate in 100 ml. of dimethylformamide. This solution is nebulized to an average droplets sizes of 5 microns by an ultrasonic vibration of 1 MHz. The generated mist is carried through a hose as shown in FIG. 1 and to an application chamber by a stream of air, in which a second stream of air is used to drive the mist droplets close to the floating glass surface. The temperature of the float glass is 600° C. The reactants are pyrolysed on the surface to form a mixed metal oxide film. This films are deposited in average time of 2 seconds.

EXAMPLE 2

An aqueous solution is prepared by dissolving 15 gr. of cobalt nitrate, 2 gr. of iron nitrate and 1 gr. of chromium nitrate in 100 ml. of water. This solution is atomized and conducted to the hot float glass surface as described in the previous example to obtain the mixed metal oxide film. The glass temperature in this case was 500° C. and the deposition time was 5 seconds.

EXAMPLE 3

Using a double mix generator arrangement, in a nebulizer chamber 1, a reactive solution is prepared by dissolving 20 gr. of aluminum acetylacetonate in 100 ml. of benzene. In a nebulizer chamber 2, a second reactive solution is prepared by dissolving 15 gr. of cobaltous acetylacetonate and 5 gr. of ferric acetylacetonate in 100 ml. of dimethylformamide. Both solutions are atomized at an ultrasonic vibrator of 1 MHz. Both generated aerosols are carried through a common pipe and through a mixing chamber and to the application chamber to be directed to the hot glass as it has been explained previously. The glass temperature was 600° C. and at a deposition time of 5 seconds.

We claim:

1. A method for coating a glass ribbon with a mist of fine droplets, comprising:

(a) providing a plurality of independent reservoirs, each reservoir having a pipe connected to a mixing chamber;

(b) forming a solution containing a different chemical precursor in a suitable solvent, in each—of three—reservoirs—, wherein a first precursor in a first reservoir is selected from the group consisting of cobaltous acetylacetonate, ferric acetylacetonate, chromic acetylacetonate, and mixtures thereof, and the solvent is dimethylformamide; a second precursor in a second reservoir is aluminum acetylacetonate and the solvent is benzene; and a third precursor in a third reservoir is titanium acetylacetonate and the solvent is methylene chloride;

(c) nebulizing the solution in each reservoir, by ultrasonic vibration, to form a mist of fine droplets in each reservoir;

(d) conducting the mist of each reservoir to the mixing chamber through its respective pipe;

(e) mixing the mist of each independent reservoir with the mist of the other reservoirs in the mixing chamber to form a mist mixture;

(f) conducting the mist mixture to a glass annealing chamber; and (g) depositing the mist mixture on a continuous ribbon of hot glass to be pyrolyzed on said glass ribbon in said annealing chamber whereby a coating is formed on the glass ribbon.

2. The method as claimed in claim 1, wherein the nebulizing of each solution in each reservoir is carried out in a nebulization chamber in the reservoir.

3. The method as claimed in claim 1, wherein the conducting of the mist to the hot glass substrate is carried out by a stream of a carrier gas, to be deposited on a surface of the hot glass substrate by pyrolysis in the glass annealing chamber.

4. The method as claimed in claim 1, wherein the conducting of the mist by the stream of a carrier gas is accelerated by a controlled flow of an oxidant gas.

5. The method as claimed in claim 1, wherein the step of depositing the mist is carried out at an annealing chamber during a glass manufacturing process, wherein the temperature of the glass ribbon is from about 580° C. to about 610° C., to pyrolyze the fine droplets on the hot glass forming a coating thereon.

* * * * *